(12) United States Patent
Moireau et al.

(10) Patent No.: US 10,173,924 B2
(45) Date of Patent: Jan. 8, 2019

(54) ELECTRICALLY CONDUCTING GLASS STRANDS AND STRUCTURES COMPRISING SUCH STRANDS

(71) Applicant: SAINT-GOBAIN TECHNICAL FABRICS EUROPE, Chambery (FR)

(72) Inventors: Patrick Moireau, Curienne (FR); Claire Ceugniet, Saint Ours (FR)

(73) Assignee: SAINT-GOBAIN TECHNICAL FABRICS EUROPE, Chambery (FR)

( * ) Notice: Subject to any disclaimer, the term of this patent is extended or adjusted under 35 U.S.C. 154(b) by 421 days.

(21) Appl. No.: 14/826,780

(22) Filed: Aug. 14, 2015

(65) Prior Publication Data

US 2016/0060165 A1    Mar. 3, 2016

Related U.S. Application Data (63) Continuation of application No. 10/588,720, filed as application No. PCT/FR2005/050087 on Feb. 11, 2005.

(30) Foreign Application Priority Data

Feb. 12, 2004 (FR) ..................................... 04 01426

(51) Int. Cl.
*C03C 25/24* (2018.01)
*C09D 5/24* (2006.01)
(Continued)

(52) U.S. Cl.
CPC .............. *C03C 25/24* (2013.01); *C03C 25/44* (2013.01); *C03C 25/47* (2018.01); *C09D 5/24* (2013.01);
(Continued)

(58) Field of Classification Search
CPC ......... C03C 25/24–25/40; C03C 25/42; C03C 25/44; C03C 25/101; Y10T 428/292;
(Continued)

(56) References Cited

U.S. PATENT DOCUMENTS

| | | |
|---|---|---|
| 3,247,020 A | 4/1966 | Shulver et al. |
| 3,269,883 A | 8/1966 | Shulver et al. |

(Continued)

FOREIGN PATENT DOCUMENTS

| | | |
|---|---|---|
| EP | 0989103 | 3/2000 |
| GB | 1262070 | 2/1972 |
| WO | WO99/44956 | 9/1999 |

OTHER PUBLICATIONS

King et al., "Thermal and Electrical Conductivity of Carbon-Filled Liquid Crystal Polymer Composites", Journal of Applied Polymer Science, vol. 99, pp. 1552-1558, 2006.

(Continued)

*Primary Examiner* — Jeremy R Pierce
(74) *Attorney, Agent, or Firm* — Oblon, McClelland, Maier & Neustadt, L.L.P.

(57) ABSTRACT

The invention relates to glass strands and glass strand structures coated with an electrically conducting coating composition which comprises (as % by weight of solid matter):
  6 to 50% of a film-forming agent, preferably 6 to 45%,
  5 to 40% of at least one compound chosen from plasticizing agents, surface-active agents and/or dispersing agents,
  20 to 75% of electrically conducting particles,
  0 to 10% of a doping agent,
  0 to 10% of a thickening agent,
  0 to 15% of additives.

The invention also relates to the electrically conducting coating composition used to coat the said strands and strand
(Continued)

structures, to their process of manufacture and to the composite materials including these strands or strand structures. Application to the preparation of structures and composite materials which can be heated by the Joule effect or which can be used for electromagnetic shielding.

10 Claims, 1 Drawing Sheet (51) Int. Cl.
*C03C 25/44* (2006.01)
*C03C 25/47* (2018.01)
(52) U.S. Cl.
CPC ............... *Y10T 428/249922* (2015.04); *Y10T 428/249924* (2015.04); *Y10T 428/249932* (2015.04); *Y10T 428/249948* (2015.04); *Y10T 428/292* (2015.01); *Y10T 428/2938* (2015.01)
(58) Field of Classification Search
CPC ..... Y10T 428/2938; Y10T 428/249922; Y10T 428/249924; Y10T 428/249932; Y10T 428/249948
USPC ...... 428/292.1, 222, 294.1, 294.7, 375, 378, 428/367
See application file for complete search history.

(56) References Cited

U.S. PATENT DOCUMENTS

| | | |
|---|---|---|
| 3,406,126 A | 10/1968 | Litant |
| 3,696,054 A | 10/1972 | Saunders |
| 3,928,666 A | 12/1975 | Morrison et al. |
| 4,035,265 A | 7/1977 | Saunders |
| 4,090,984 A | 5/1978 | Lin et al. |
| 4,209,425 A | 6/1980 | Lin et al. |
| 4,318,719 A | 3/1982 | Kato et al. |
| 4,429,216 A | 1/1984 | Brigham |
| 4,474,685 A | 10/1984 | Annis |
| 4,503,284 A | 3/1985 | Minnick et al. |
| 4,528,213 A | 7/1985 | Nelson et al. |
| 4,619,741 A | 10/1986 | Minten et al. |
| 4,689,601 A | 8/1987 | Cofey et al. |
| 4,696,764 A | 9/1987 | Yamazaki |
| 4,698,179 A | 10/1987 | Suzuki et al. |
| 4,700,171 A | 10/1987 | Coffey et al. |
| 4,704,596 A | 11/1987 | Coffey et al. |
| 4,973,514 A | 11/1990 | Gamble et al. |
| 5,004,561 A | 4/1991 | Nomura et al. |
| 5,139,642 A | 8/1992 | Randolph et al. |
| 5,476,580 A | 12/1995 | Thorn et al. |
| 5,656,371 A | 8/1997 | Kawahigashi et al. |
| 5,690,805 A | 11/1997 | Thorn et al. |
| 5,725,807 A | 3/1998 | Thorn et al. |
| 6,086,791 A | 7/2000 | Miller |
| 6,419,981 B1 | 7/2002 | Novich et al. |
| 6,503,964 B2 | 1/2003 | Smith et al. |
| 6,620,497 B2 | 9/2003 | Smith et al. |
| 2004/0028859 A1 | 2/2004 | Legrande et al. |
| 2008/0213560 A1* | 9/2008 | Moireau ............... C03C 25/101 428/222 |
| 2009/0239056 A1 | 9/2009 | Moireau et al. |

OTHER PUBLICATIONS

Li et al., "Electrically Conducting Powder Filled Polyimidesiloxane", Composites, vol. 22, No. 3, pp. 221-218, 1991.
University of Cambridge, "Conductivity and Acknowledgments", pp. 1-4, 2007.
Mamunya et al., "Electrical and Thermal conductivity of Polymers Filled with Metal Powders", European Polymer Journal 38, pp. 1887-1897, 2002.

\* cited by examiner

ELECTRICALLY CONDUCTING GLASS STRANDS AND STRUCTURES COMPRISING SUCH STRANDS

CROSS-REFERENCE TO RELATED APPLICATIONS

This application is a Continuation of U.S. application Ser. No. 10/588,720, filed on Jan. 10, 2007, now abandoned, which is a National Stage of application PCT/FR05/50087, filed on Feb. 11, 2005.

BACKGROUND OF THE INVENTION

Field of the Invention

The present invention relates to glass strands comprising an electrically conducting coating.

It also relates to the electrically conducting coating composition used to coat the said strands, to the process for the manufacture of these strands, to the reinforcing structures formed from these strands and to the composite materials including these strands.

Description of the Background

Reinforcing glass strands are conventionally prepared by mechanically drawing molten glass streams flowing by gravity from the multiple orifices of bushings filled with molten glass, to form filaments which are gathered together into base strands, which strands are then collected.

During the drawing, and before they are gathered together into strands, the glass filaments are coated with a sizing composition, generally an aqueous sizing composition, by passing over a sizing member.

The role of the size is essential in two respects.

During the manufacture of the strands, it protects the filaments from the abrasion resulting from the rubbing of the latter at high speed over the members of the process, acting as a lubricant. It also makes it possible to remove the electrostatic charges generating during this rubbing. Finally, it gives cohesion to the strand by providing bonding of the filaments to one another.

During the use for the purpose of producing composite materials, the size improves the wetting of the glass and the impregnation of the strand by the matrix to be reinforced and it promotes the adhesion between the glass and the said matrix, thus resulting in composite materials with improved mechanical properties.

The glass strands in their various forms (continuous, chopped or milled strands, mats, grids, fabrics, and the like) are commonly used to effectively reinforce matrices of varied natures, for example thermoplastic or thermosetting materials and cement.

Generally, the glass strands are rendered conducting by the application of a coating based on particles capable of conducting the electrical current. The coating is obtained by depositing, on the strands coated with the size, the conducting particles in dispersion or in suspension in an aqueous medium and by removing the water by heating at an appropriate temperature.

The compositions known for the preparation of the abovementioned coating use, as conducting particles, graphite, carbon black or organometallic compounds capable of decomposing to give metals under the action of heat, if appropriate by introducing a carbon-comprising compound capable of giving carbon by thermal decomposition into the composition (U.S. Pat. No. 3,269,883) or into the size (U.S. Pat. No. 3,247,020).

In U.S. Pat. No. 4,090,984, use is made of a semiconducting coating composition comprising at least one polyacrylate emulsion, one carbon black dispersion and one thixotropic gelling agent. The carbon black dispersion represents 20 to 40 parts per 100 parts of the composition. In example 1, the content of carbon black is equal to 11.9% by weight of the solid matter present in the composition.

In U.S. Pat. No. 4,209,425, the coating composition comprises conducting particles, in particular made of graphite or of carbon, at least one surfactant, one thixotrophic gelling agent and optionally one organosilane coupling agent and/or one antifoaming agent. The content of conducting particles in the composition is between 5 and 15% by weight of solid matter of the composition.

With the compositions which have just been mentioned, the content of conducting particles in the final coating remains low, resulting for this reason in a low level of electrical conductivity.

Recent times have seen the appearance of novel materials incorporating glass strands which exhibit high electrical conductivity properties and which can for this reason be heated by the Joule effect. These materials include in particular composite materials with an organic matrix, of the thermoplastic or thermosetting polymer type, or cement matrix, in which materials the abovementioned strands also play a reinforcing role.

The improvement in the electrical conductivity must not be made at the expense of the other properties. As regards the composite materials, it must in particular be kept in mind that the strands are above all intended to reinforce matrices and consequently they must exhibit all the qualities for this.

In particular, the conducting coating must:

provide bonding of the filaments to one another and also bond the strands so as to obtain acceptable or improved mechanical properties when composite materials are concerned, protect the glass strands from the mechanical assaults which occur when the reinforcing structures are employed on building sites, protect the glass strands from chemical corrosion and from assaults related to the environment, so as to provide satisfactory durability, and provide good bonding with the polymer matrix to be reinforced, that is to say render the strands and the matrix compatible.

SUMMARY OF THE INVENTION

A subject-matter of the present invention is glass strands and structures incorporating glass strands provided with a coating which exhibits a high electrical conductivity and which are in addition capable of meeting the requirements related to reinforcement which are mentioned above.

Another subject-matter of the invention is the electrically conducting aqueous coating composition used to coat the abovementioned glass strands and structures.

Another subject-matter of the invention is a process for the manufacture of the glass strands and glass strand structures capable of conducting the electrical current.

A further subject-matter of the invention is the composite materials comprising a matrix reinforced by the abovementioned strands or structures capable of conducting electricity.

DETAILED DESCRIPTION OF THE INVENTION

The glass strands and the glass strand structures in accordance with the invention are coated with an electrically conducting coating composition which comprises (as % by weight of solid matter):
- 6 to 50% of a film-forming agent, preferably 6 to 45%,
- 5 to 40% of at least one compound chosen from plasticizing agents, surface-active agents and/or dispersing agents,
- 20 to 75% of electrically conducting particles,
- 0 to 10% of a doping agent,
- 0 to 10% of a thickening agent,
- 0 to 15% of additives.

In the context of the invention, the term "glass strands" is understood to mean both the base strands obtained by gathering together, without twisting, a multitude of filaments under the bushing, and the assemblages of these strands, in particular in the form of rovings, and the strands which have been subjected to a twisting operation, and the assemblages of these strands. In the glass strands in accordance with the invention, the filaments are coated with a sizing composition compatible in particular with the film-forming agent of the conducting coating. The electrically conducting coating will thus be superimposed on the size already present on the strand, which means that the application of this coating can be likened to a coating operation.

Still in the same context, the term "strand structures" is understood to mean structures obtained by gathering together intertwined strands, for example fabrics, or nonintertwined strands, for example nonwovens, in the form of a mat or veil of continuous strands, and grids.

The film-forming agent in accordance with the invention plays several roles: it confers mechanical cohesion on the coating by causing the conducting particles to adhere to the glass strand and by providing bonding of these particles to one another, if appropriate with the material to be reinforced; it contributes to bonding the filaments to one another; finally, it protects the strands against mechanical damage and chemical and environmental assaults.

The film-forming agent is generally a polymer, preferably with an elastomeric nature, so as to give flexibility to the strands. Flexible strands prove to be particularly advantageous in the production of structures which can be collected in the form of a wound package and which are highly "conformable", that is to say which are capable of matching virtually perfectly the most diverse shapes.

The film-forming agent can, for example, be chosen from polyvinylpyrrolidones, poly(vinyl alcohol)s, polyacrylics (homopolymers or copolymers), styrene polymers, for example of the styrene-butadiene (SBR) type, poly(vinyl chloride)s (in particular in the latex or plastisol form), polyurethanes and the blends of these polymers. Generally, thermoplastic polyolefins are avoided as a result of their electrically insulating nature and their high creep capability.

The choice of the polymer also depends on the nature of the matrix to be reinforced. As regards cementing materials, polyacrylics, styrene polymers and poly(vinyl chloride)s are preferred.

When the content of film-forming agent is less than 6% by weight of solid materials, the cohesion of the coating is inadequate. Above 50%, in particular 45%, the amount of conducting particles to be introduced is too low to achieve a satisfactory level of electrical conductivity. Preferably, the amount of film-forming agent in the coating represents 10 to 35% by weight of the solid matter and better still 15 to 35%.

The plasticizing agent makes it possible to lower the glass transition temperature of the film-forming agent to a value of the order of 20° C., which makes the coating more flexible, and also makes it possible to limit the shrinkage after the heat treatment. The polymers obtained by copolymerization of butadiene and of an acrylic monomer are preferred.

The amount of plasticizing agent in the coating generally represents 0 to 15% by weight of the solid matter, preferably 0 to 10% and better still 3 to 10%.

The surface-active agents improve the suspension and the dispersion of the conducting particles and promote compatibility between the other constituents and the water. It is preferable to use cationic or nonionic surfactants, in order to avoid problems of stability of the coating composition and of nonhomogeneous dispersion of the particles.

The amount of surface-active agent in the coating generally represents less than 10% by weight of the solid matter, preferably 0.5 to 10%.

The dispersing agents help in dispersing the conducting particles in the water and reduce their separation on settling.

The amount of dispersing agent in the coating generally represents 2 to 20% by weight of the solid matter, preferably 3 to 10%.

The plasticizing, surface-active and dispersing agents can have one or more of the functions specific to each of the categories mentioned above. The choice of these agents and of the amount to be used depends on the film-forming agents and on the conducting particles.

These agents can in particular be chosen from:
organic compounds, in particular
- optionally halogenated, aliphatic or aromatic, polyalkoxylated compounds, such as ethoxylated/propoxylated alkylphenols, preferably including 1 to 30 ethylene oxide groups and 0 to 15 propylene oxide groups, ethoxylated/propoxylated bisphenols, preferably including 1 to 40 ethylene oxide groups and 0 to 20 propylene oxide groups, or ethoxylated/propoxylated fatty alcohols, the alkyl chain of which preferably comprises 8 to 20 carbon atoms and including 2 to 50 ethylene oxide groups and up to 20 propylene oxide groups. These polyalkoxylated compounds can be block or random copolymers,
- polyalkoxylated fatty acid esters, for example polyethylene glycol fatty acid esters, the alkyl chain of which preferably comprises 8 to 20 carbon atoms including 2 to 50 ethylene oxide groups and up to 20 propylene oxide groups,
- amino compounds, for example amines, which are optionally alkoxylated, amine oxides or alkylamides, sodium, potassium or ammonium succinates and taurates, sugar derivatives, in particular sorbitan derivatives, sodium, potassium or ammonium alkyl sulphates and alkyl phosphates, and polyether phosphates, inorganic compounds, for example silica derivatives, it being possible for these compounds to be used alone or as a blend with the above-mentioned organic compounds.

If the total amount of plasticizing, surface-active and dispersing agents is less than 5%, poor dispersion of the conducting particles (presence of aggregates) and/or phase separation is/are observed. When the content exceeds 40%, a serious decline in the mechanical performance occurs.

The electrically conducting particles make it possible to confer electrical conductivity on the glass strands. In accordance with the invention, these are carbon-based particles, in particular graphite and/or carbon black particles.

Whether the graphite is natural or synthetic in origin has no effect on the electrical conductivity. It is thus possible to use without distinction either type of graphite, alone or as a mixture.

The particles can have any shape, for example the shape of a sphere, flake or needle. Nevertheless, it has been found that the electrical conductivity of a mixture of particles of different shapes is improved with respect to the same amount of particles of identical shape. Preferably, 30 to 60% of the conducting particles have a high aspect ratio (defined by the ratio of the greatest dimension to the smallest dimension) preferably varying from 5 to 20, in particular of the order of 10, and advantageously at least 15% of the particles are provided in the flake or needle shape.

As well as the shape, the size of the particles is an important parameter from the viewpoint of the electrical conductivity. As a general rule, the size of the particles, taken in their greatest dimension, does not exceed 250 µm, preferably 100 µm.

Advantageously, the abovementioned particles, generally made of graphite, are combined with an electrically conducting carbon black powder with a particle size of less than or equal to 1 µm, preferably exhibiting a mean size of between 50 and 100 nm. The carbon black particles, as a result of their small size, make it possible to create contact points between the graphite particles, which makes it possible to further improve the electrical conductivity.

Preferably, the conducting coating composition comprises (as % by weight of solid matter):
- 2.5 to 45% and better still 15 to 40% of graphite particles having a size of between 10 and 100 µm, at least 5% by weight of these particles being provided in the form of flakes or needles with an aspect ratio of greater than or equal to 5,
- 0 to 45%, preferably 5 to 25%, of graphite particles with a size of less than 10 µm, preferably having a mean size of the order of 4 µm,
- 2.5 to 45%, preferably 15 to 40%, of carbon black particles having a size of less than 1 µm.

As already indicated, the amount of conducting particles represents 20 to 75% of the weight of the solid matter of the coating. If the content is less than 20%, there is no electrical conduction as the percolation threshold is not reached. When the content exceeds 75%, a portion of the particles no longer adheres to the glass strand.

The doping agent makes it possible to increase the conductivity by contributing free electrons or by promoting delocalization of the electrons.

The doping agent is chosen from organic salts, such as ammonium crotonate, lithium dodecyl sulphate and copper acetylacetonate, or inorganic salts, such as ammonium polyphosphate, titanium chloride or zinc chloride. Preferably, ammonium crotonate is used.

The doping agent advantageously represents less than 5% of the weight of solid matter of the coating. Nevertheless, owing to the fact that the increase in conductivity remains low with respect to the amount introduced and that problems of resistance to ageing may occur, it is preferable to limit the content of doping agent to 1%. In the majority of cases, no doping agent is added.

The thickening agent makes it possible to adjust the viscosity of the coating composition to the conditions of application to the strand by stabilizing the dispersion of the particles so as to prevent them from settling on standing, thus making possible the deposition of the desired amount on the strand.

The thickening agent is chosen from strongly hydrophilic compounds, such as carboxymethylcelluloses, gums, for example guar or xanthan gums, alginates, polyacrylics, polyamides and the blends of these compounds.

The amount of thickening agent, when it is used, varies according to the nature of the compound (the grade, in the case of the carboxymethyl-celluloses).

Preferably, the content of thickening agent is less than 10% by weight of the solid matter of the coating.

The conducting coating can also comprise the usual additives for glass strands, in particular adhesion promoters, which make it possible to improve the coupling between the glass and the material to be reinforced, such as silanes, lubricating and/or antifoaming agents, such as mineral oils, fatty esters, for example isopropyl palmitate and butyl stearate, or organic polymers, or complexing agents, such as derivatives of EDTA or of gallic acid.

Preferably, the total amount of additives is less than 10% by weight of the solid matter of the coating.

The conducting coating composition capable of coating the glass strands in accordance with the invention comprises abovementioned constituents and water.

The content of water in the coating composition depends on the conditions of application, in particular on the viscosity and on the content of conducting particles to be deposited. As a general rule, the amount of water is determined so as to obtain a viscosity of greater than or equal to 190 mPa·s, preferably of less than 40 000 mPa·s, advantageously of less than 20 000 mPa·s, better still of less than 10 000 mPa·s, in particular of less than or equal to 5400 mPa·s.

The composition is prepared conventionally by introducing the various constituents in the aqueous medium, preferably individually, with sufficient stirring to keep the conducting particles in dispersion or in suspension.

When a thickening agent is used, it is introduced first in the form of an aqueous solution, preferably heated to approximately 80° C. in order to dissolve better.

Generally, the coating composition is used virtually immediately after having been prepared but it can also be used after a storage period of approximately six months at a temperature of 20 to 25° C. If appropriate, vigorous stirring makes it possible to redisperse the particles which have separated by settling, without this affecting the qualities of the composition.

In accordance with the invention, the process for the manufacture of the glass strands and of the strand structures coated with the electrically conducting coating comprises the stages consisting in:
- coating glass strands or glass strand structures with the abovementioned conducting coating composition, and
- heating the said strands or the said structures, thus coated, at a temperature sufficient to remove the water and to strengthen the conducting coating.

The composition is applied to glass strands at various stages of the process after fiberizing, preferably to strands originating from wound packages, for example rovings, or to structures in which the strands are gathered together in various ways: by superimposition of continuous strands deposited in a random manner (mat or veil) or ordered manner (grid) or by weaving with intertwining of the strands.

According to a preferred embodiment, the coating of the strand or of the strand structure is carried out by immersion in a bath of the conducting coating composition. In the bath, the strand or the structure passes into a device which makes it possible to control the amount of coating composition to be deposited.

In the case of strands, the device can be a bushing positioned in the bath, preferably a conical bushing, the angle of the cone of which is defined so that the strand entering via the biggest opening can be coated by the composition in a uniform way over the whole of its surface.

As regards strand structures, the device can be a padding machine, of the type used in the textile industry, positioned at the outlet of the bath.

Optionally, before passing through the bushing or over the padding machine, the strand or the structure can pass over a device targeted at "opening" the strands and making possible better impregnation of the filaments. This device can be composed of one or more series of bars forming turn rolls, in the case of the treatment of the strand, or of a series of rollers, for the treatment of strand structures.

At the outlet of the bath, the strand or the structure is treated thermally to remove the water and to strengthen the coating. As a general rule, the treatment temperature is greater than approximately 105° C. and less than approximately 220° C., preferably less than 160° C. To prevent blistering of the coating brought about by rapid removal of the water, it is preferable to heat the strand or the structure at a temperature close to the minimum temperature indicated, if need be while increasing the duration of treatment, or to carry out the treatment continuously over the complete temperature range in successive stationary phases or with a temperature gradient. Preferably, the maximum temperature remains less than approximately 150° C., and better still less than 130° C.

Any appropriate heating device can be used for this, for example an infrared oven or a device which makes it possible to heat the strand or the structure by contact, for example a device composed of one or more rotary heating drums.

The temperature and the duration of the treatment are chosen according to the type of device used so as to obtain a strengthened coating. By way of indication, the treatment in an oven can be carried out satisfactorily at a temperature of the order of 105° C. for a time which generally does not exceed 3 hours.

After the heat treatment, the glass strand is collected, for example in the form of wound packages, or else it is deposited on a translationally moving receiving support to form a mat.

The glass strand and the strand structure in accordance with the invention are characterized in that they have electrical conduction properties while having the qualities specific to providing a reinforcing function. The strand and the structure are noteworthy in that the amount of conducting coating can represent up to 200% of their total weight, more generally of the order of 20 to 60%, and that this relatively high content of conducting particles confers thereon an altogether advantageous level of performance. An assessment of this level is given by the value of the volume electrical resistivity (equal to the inverse of the volume electrical conductivity), which is a standard reference term in the field of conducting strands. The volume electrical resistivity of the strand according to the invention is less than 1000 $\Omega \cdot cm$, preferably 100 $\Omega \cdot cm$, advantageously 10 $\Omega \cdot cm$ and better still 1 $\Omega \cdot cm$. The strands and the structures exhibiting a volume electrical resistivity varying from 10 to 100 $\Omega \cdot cm$ can be used for Joule effect heating. Those for which the said resistivity is less than or equal to 1 $\Omega \cdot cm$ are more particularly suitable for electromagnetic shielding.

The conducting strand and the strands which are constituents of the structure in accordance with the invention can be made of any kind of glass, for example E-, C-, R- and AR-glass. E-glass is preferred.

The diameter of the glass filaments constituting the strands can vary to a large extent, for example from 5 to 30 μm. In the same way, large variations can occur in the weight per unit length of the strand, which can range from 68 to 2400 tex according to the applications targeted.

The conducting glass strand and the conducting structures in accordance with the invention can be used to reinforce various materials and thus to form conducting composite materials capable in particular of being heated by the Joule effect. As has already been said, such composite materials can be used for the heating of buildings or the de-icing of roads, bridges or landing runways.

The structures can, as such, act as electromagnetic shielding or heating elements applied at the surface or incorporated in wall faces or the ground.

As shielding elements, the purpose of the structures is to weaken electromagnetic waves harmful to the satisfactory operation of electronic devices or to limit, indeed even prevent, the use of portable telephones in certain public or private places (hospitals, cinemas, prisons, and the like).

Structures in the form of grids can be incorporated in particular in structures, for example bridges, to limit battery effects related to the presence of metal components which increase the risks of corrosion.

The examples given below make it possible to illustrate the invention without, however, limiting it.

EXAMPLES

In these examples, the following methods are used:
The loss on ignition is measured in the following way: a predetermined amount (approximately 1 gram) of cut strands is introduced into a porcelain crucible (weight W1). The crucible is heated in an oven at 105° C. for 1 hour to evaporate the adsorbed water. On removal from the oven and after cooling, the crucible is weighed (weight W2) and is then heated in an oven at 700° C. for 5 hours. The crucible is weighed on removal from the oven after cooling under anhydrous conditions (weight W3).

The loss on ignition is equal to: W2−W3/W2−W1.
The tensile strength of the strands is measured under the following conditions.

The ends of a roving of a 2000 tex base strand, with a length of 240 mm, are placed between flat clamping jaws lined with Vulcolan® over a distance of 70 mm. The roving is drawn at the rate of 100 mm/min until it breaks. The strength is expressed in MPa.

The volume resistivity is obtained by the calculation from the relationship:

$$\rho = R \times S/l$$

in which
 $\rho$ is the resistivity in $\Omega \cdot cm$,
 R is the resistance in $\Omega$,
 S is the cross section of the strand in $cm^2$,
 l is the length of the fibre in cm.

The resistance R is measured using an ohmmeter, the distance between the two electrodes being 20 cm.

The electromagnetic shielding, in dB, is measured under the conditions of Standard MIL-STD-285 (27 Jun. 1956) between 100 MHz and 2.7 GHz.

Example 1 a) Preparation of the Coating Composition

A composition is prepared comprising (as % by weight of solid matter):

| | |
|---|---|
| film-forming agent: polyvinylpyrrolidone [1] | 20 |
| thickening agent: carboxymethycellulose [2] | 2 |
| plasticizers: | |
| bisphenol A bis(polyethylene glycol) ether [3] | 16.5 |
| octylphenoxypoly(ethyleneoxy)ethanol [4] | 8.5 |
| cationic dispersant [5] | 3 |
| conducting particles | |
| natural graphite powder [6] (mean size of the particles: 3 μm) | 30 |
| expanded synthetic graphite [7] in the form of flakes (size of the particles: 10-50 μm) | 10 |
| natural graphite powder [8] (mean size of the particles: 5 μm) | 10 |

The composition is prepared by addition of the constituents to a receptacle containing water at 80° C. which is kept vigorously stirred, the thickening agent being introduced first and the conducting particles last.

The viscosity of the composition is 3800 mPa·s at 20° C.

b) Production of the Glass Strand

A glass strand composed of 4000 filaments with a diameter of 15.8 μm (weight per unit length: 2000 tex) unwound from a roving is immersed in a bath of the composition obtained under a). The strand enters the bath via a strand guide at the rate of 2.5 m/min, subsequently passes through a conical bushing (small diameter: 2.2 mm) and, at the outlet of the bath, is wound onto a frame rotating around an axis. The frame is placed in an oven heated at 105° C. for 3 hours.

The strand exhibits the following characteristics:
Loss on ignition: 21.0%
Resistivity: 7.8 Ω·cm (standard deviation: 2.3)
Tensile strength: 863 MPa (standard deviation: 23)

Example 2

The operation is carried out under the conditions of Example 1, the conducting coating composition comprising (in % by weight of solid matter):

| | |
|---|---|
| film-forming agent: polyvinylpyrrolidone [1] | 20 |
| thickening agent: carboxymethylcellulose [2] | 2 |
| plasticizers: | |
| bisphenol A bis(polyethylene glycol) ether [3] | 16 |
| octylphenoxypoly(ethyleneoxy)ethanol [4] | 7 |
| cationic dispersant [5] | 5 |
| conducting particles | |
| natural graphite powder [6] (mean size of the particles: 3 μm) | 25 |
| expanded synthetic graphite [7] in the form of flakes (size of particles: 10-50 μm) | 15 |
| synthetic graphite powder [9] (mean size of the particles: 10 μm) | 10 |

The viscosity of the composition is 5400 mPa·s at 20° C.
The strand exhibits a loss on ignition of 20.0%.
The resistivity and tensile strength measurements of the strand before and after accelerated ageing are as follows (the standard deviation is given in brackets):

| Time (days) | t = 0 | t = 1 | t = 14 |
|---|---|---|---|
| Resistivity (Ω · cm) | 1.55 (0.4) | 1.7 (0.2) | 1.8 (0.2) |
| Tensile strength (MPa) | 1130 (62) | 1044 (50) | 950 (78) |

After ageing for 14 days, the resistivity is substantially unchanged and the tensile strength is equal to 84% of its initial value.

Examples 3 and 4

These examples illustrate the effect of amount of conducting particles of high aspect ratio on the resistivity.

The operation is carried out under the conditions of Example 1, modified in that the following compositions are used (in % by weight of solid matter):

| | | |
|---|---|---|
| film-forming agent: polyvinyl-pyrrolidone [1] | 20.0 | |
| thickening agent: carboxymethyl-cellulose [2] | 2.00 | |
| plasticizers: | | |
| bisphenol A bis(polyethylene glycol) ether [3] | 10.25 | |
| octylphenoxypoly(ethyleneoxy) ethanol [4] | 10.25 | |
| cationic dispersant [5] | 7.50 | |
| conducting particles | Ex. 3 | Ex. 4 |
| graphite powder (10) in the form of flakes (size of the particles: 10-50 μm) | 2.5 | 15.0 |
| synthetic graphite powder [9] (mean size of the particles: 10 μm) | 47.5 | 35.0 |

The viscosities of the compositions are 4900 mPa·s and 5400 mPa·s respectively at 20° C.

The strands obtained exhibit the following characteristics (the standard deviation is given in brackets):

| | Ex. 3 | Ex. 4 |
|---|---|---|
| Loss on ignition (%) | 20.4 | 19.8 |
| Resistivity (Ω · cm) | 2.9 (0.8) | 2.3 (0.3) |
| Tensile strength (MPa) | 1320 (115) | 1348 (58) |

It is found that an increase in the relative proportion of particles in the form of flakes, at an equivalent total amount of particles, makes it possible to reduce the resistivity and thus to increase the electrical conductivity.

Example 5

The operation is carried out under the conditions of Example 1, modified in that the strand is composed of 800 filaments with a diameter of 13.6 μm (weight per unit length: 300 tex), that the small diameter of the bushing is equal to 1.2 mm and that the conducting coating composition comprises (as % by weight of solid matter):

| film-forming agent: polyvinylpyrrolidone [1] | 20.0 |
| --- | --- |
| thickening agent: carboxymethylcellulose [2] | 2.0 |
| plasticizers: | |
| bisphenol A bis(polyethylene glycol) ether [3] | 17.0 |
| octylphenoxypoly(ethyleneoxy)ethanol [4] | 6.0 |
| nonionic dispersant [11] | 5.0 |
| conducting particles | |
| expanded synthetic graphite [7] in the form of flakes (size of the particles: 10-50 μm) | 25.0 |
| carbon black powder [12] (mean size of the particles: 50 nm) | 25.0 |

The viscosity of the composition is 4800 mPa·s at 20° C.

The strand exhibits the following characteristics (the standard deviation is given in brackets):

Loss on ignition: 14.4%

Resistivity: 0.3 Ω·cm (0.04); identical after storing at 20° C. for 15 weeks

Tensile strength: 1361 (93) MPa.

Example 6

The operation is carried out under the conditions of Example 1, the conducting coating composition comprising (as % by weight of solid matter):

| film-forming agents: | |
| --- | --- |
| acrylic polymer [13] | 33.8 |
| acrylic copolymer [14] | 10.0 |
| surfactants: | |
| 2,4,7,9-tetramethyl-5-decyn-4,7-diol [15] | 0.2 |
| 10 EO $C_{12}$-$C_{14}$ alcohol [16] | 1.0 |
| nonionic dispersant [11] | 5.0 |
| conducting particles | |
| expanded synthetic graphite [7] in the form of flakes (size of the particles: 10-50 μm) | 20.0 |
| synthetic graphite powder [17] (size of the particles: 1-10 μm) | 10.0 |
| carbon black powder [12] (mean size of the particles: 50 nm) | 20.0 |

The viscosity of the composition is 590 MPas at 20° C.

The strand exhibits a loss on ignition of 42.1%.

The resistivity and the tensile strength of the strand, before and after accelerated ageing, are given below (the standard deviation appears in brackets):

| Time (days) | t = 0 | t = 1 | t = 3 |
| --- | --- | --- | --- |
| Resistivity (Ω · cm) | 0.18 (0.01) | 0.18 (0.31) | 0.18 (0.01) |
| Tensile strength (MPa) | 1876 (115) | 1695 (78) | 1565 (43) |

| Time (days) | t = 7 | t = 14 |
| --- | --- | --- |
| Resistivity (Ω · cm) | 0.17 (0.02) | 0.15 (0.01) |
| Tensile strength (MPa) | 1503 (158) | 1697 (38) |

The resistance of the strands under the accelerated ageing conditions is excellent: the high level of performance, in particular the tensile strength, is maintained over time.

Example 7

The operation is carried out under the conditions of Example 1, the conducting coating composition comprising (as % by weight of solid matter):

| film-forming agents: | |
| --- | --- |
| acrylic polymer [13] | 38.9 |
| acrylic copolymer [14] | 11.5 |
| surfactants: | |
| 2,4,7,9-tetramethyl-5-decyn-4,7-diol [15] | 0.2 |
| 10 EO $C_{12}$-$C_{14}$ alcohol [16] | 1.0 |
| nonionic dispersant [11] | 4.4 |
| conducting particles | |
| expanded synthetic graphite [7] in the form of flakes (size of the particles: 10-50 μm) | 22.0 |
| carbon black powder [12] (mean size of the particles: 50 nm) | 22.0 |

The viscosity of the composition is 1820 mPa·s at 20° C.

The strand exhibits the following characteristics:

Loss on ignition: 39.8%

Resistivity t=0 days: 0.17 Ω·cm (standard deviation: 0.01)

t=14 days: 0.16 Ω·cm (standard deviation: 0.03)

Tensile strength:

t=0 days: 1864 MPa (standard deviation: 50)

t=14 days: 1648 MPa (standard deviation: 72)

Example 8

The operation is carried out under the conditions of Example 1, the conducting coating composition comprising (as % by weight of solid matter):

| film-forming agents: | |
| --- | --- |
| acrylic polymer [13] | 23.8 |
| acrylic copolymer [14] | 20.0 |
| plasticizers/surfactants: | |
| nonionic surfactant [15] | 0.2 |
| ethoxylated fatty alcohol [16] | 1.0 |
| cationic dispersant [5] | 5.0 |
| conducting particles | |
| expanded synthetic graphite [10] in the form of flakes (size of the particles: 10-50 μm) | 20.0 |
| synthetic graphite powder [17] (size of the particles: 1-10 μm) | 10.0 |
| carbon black powder [12] (size of the particles: 50 nm) | 20.0 |

The viscosity of the composition is 190 mPa·s at 20° C.

The strand exhibits the following characteristics:

Loss on ignition: 39.51%

Resistivity: 0.17 Ω·cm

Tensile strength: 1673.3 MPa

Example 9

This example illustrates the influence of the amount of coating on the electrical conductivity and the mechanical properties of the strand.

a) Preparation of the Coating Composition

A composition is prepared comprising (as % by weight of solid matter):

| film-forming agent: | |
| --- | --- |
| styrene-butadiene copolymer[18] | 46.5 |
| nonionic dispersant[11] | 6.0 |
| antifoaming agent[19] | 1.0 |
| conducting particles | |
| expanded synthetic graphite[7] in the form of flakes (size of the particles: 10-50 μm) | 18.6 |
| synthetic graphite powder[17] (size of the particles: 1-10 μm) | 9.3 |
| carbon black powder[12] (size of the particles: 50 nm) | 18.6 |

The composition is prepared by addition of the constituents to a receptacle containing water at ambient temperature (approximately 25° C.) with vigorous stirring, the conducting particles being introduced last.

The composition exhibits a viscosity of 800 mPa·s at 20° C.

b) Production of the Glass Strand

The operation is carried out under the conditions of Example 1, modified in that the glass strand is composed of 800 filaments with a diameter of 13 μm (weight per unit length: 275 tex).

A variable amount of conducting coating composition is deposited on the glass strand (Tests 1 to 3).

| | Test 1 | Test 2 | Test 3 |
| --- | --- | --- | --- |
| Loss on ignition (%) | 21.9 | 30.6 | 45.7 |
| Volume resistivity (Ω · cm) | 0.23 | 0.16 | 0.14 |
| Tensile strength (MPa) | 2035 | 2045 | 2059 |

It is found that the volume resistivity decreases as a function of the amount of coating composition deposited on the strand, which means that the electrical conductivity is increased. At the same time, the tensile strength level is virtually unchanged (the increase observed not being significant).

Example 10

The operation is carried out under the conditions of Example 9 while varying the ratio by weight of the conducting particles (P) to the sum of the conducting particles (P) and of the film-forming agent (F). The loss on ignition is between 21 and 23%.

| Test | P/P + F (%) | Volume resistivity (Ω · cm) |
| --- | --- | --- |
| 1 | 25 | 4.11 |
| 2 | 30 | 1.14 |
| 3 | 35 | 0.75 |
| 4 | 40 | 0.42 |
| 5 | 50 | 0.23 |
| 6 | 60 | 0.24 |

For these values, it is deduced that the percolation threshold (corresponding to the P/P+F ratio starting from which the strand exhibits a satisfactory conductivity) is between 30 and 35%.

Example 11 a) Preparation of the Coating Composition

The operation is carried out under the conditions of Example 9, the coating composition comprising (as % by weight of solid matter):

| film-forming agent: | |
| --- | --- |
| styrene-butadiene copolymer[20] | 46.5 |
| nonionic dispersant[11] | 6.0 |
| antifoaming agent[19] | 1.0 |
| conducting particles | |
| expanded synthetic graphite[7] in the form of flakes (size of the particles: 10-50 μm) | 18.6 |
| synthetic graphite powder[17] (size of the particles: 1-10 μm) | 9.3 |
| carbon black powder[12] (size of the particles: 50 nm) | 18.6 |

The composition exhibits a viscosity of 230 mPa·s at 20° C.

b) Production of the Glass Fabric

A glass fabric (weight per unit area: 165 g/m$^2$) exhibiting a square mesh of 35 mm and a thickness of 0.4 mm is immersed in a vat with a width of 300 mm filled with the composition obtained under a). At the outlet of the vat, the fabric is squeezed by passing between the two rolls of a calendar (pressure: 0.6 bar; speed of rotation: 0.5 m/min) and then it passes into an air oven comprising 4 compartments heated at 90° C., 130° C., 150° C. and 90° C. respectively. The residence time in each compartment is 2 minutes.

Various tests were carried out with a level of coating (weight of coating/weight of uncoated fabric) of 30% (Test 1), 60% (Test 2) and 115% (Test 3). Several passes through the impregnation bath were carried out in order to obtain the highest levels (Tests 2 and 3).

Figure 1:
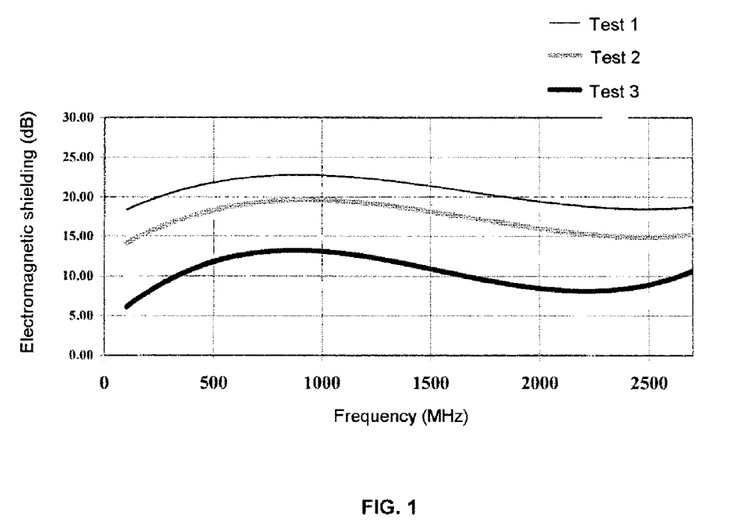
FIG. 1: curve of the electromagnetic shielding as a function of the frequency in Example 11.

The curve of the electromagnetic shielding as a function of the frequency is given in FIG. 1.

The fabric according to the invention exhibits a shielding value of greater than 5 dB and of less than 25 dB depending on the level of coating, over the entire frequency range examined.

It is specified that a shielding value of 10 dB corresponds to a weakening in the strength of the electrical field by a factor of 3, a value of 20 dB corresponds to a weakening by a factor of 10 and a value of 30 dB corresponds to a weakening by a factor of 30.

Tests 1 to 3 exhibit values of the same order of magnitude as the available fabrics which are suitable for electromagnetic shielding. In particular, the level of performance of Test 2 is comparable with that which is obtained with a fabric based on copper wires and on glass strands which are comingled and provided with a conducting coating and which are arranged in weft and in warp. However, this fabric is not entirely satisfactory as, on the one hand, the contact of the copper wires at the crossing points is not always assured and, on the other hand, the copper has a tendency to oxidize to form an insulating surface layer which results in a reduction in the electrical conductivity.

Example 12

The operation is carried out under the conditions of Example 11, modified in that the coating composition comprises (as % by weight of solid matter):

| film-forming agent: | |
|---|---|
| styrene-butadiene copolymer[20] | 37.0 |
| nonionic dispersant[11] | 7.0 |
| antifoaming agent[19] | 1.0 |
| conducting particles | |
| expanded synthetic graphite[7] | 22.0 |
| synthetic graphite powder[17] | 11.0 |
| carbon black powder[12] | 22.0 |

The composition exhibits a viscosity of 545 mPa·s at 20° C.

The fabric was impregnated with a level of coating of 32% (Test 1), 64% (Test 2) and 160% (Test 3).

Figure 2:
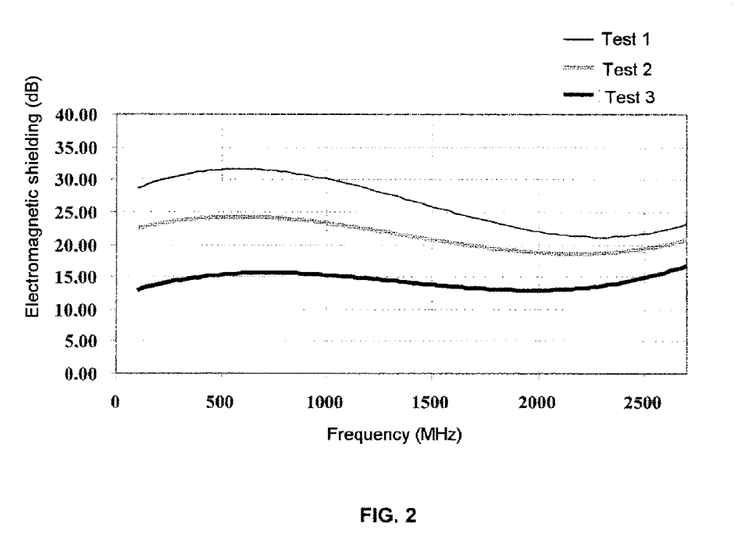
FIG. 2: curve of the electromagnetic shielding as a function of the frequency in Example 12.

The curve of the electromagnetic shielding as a function of the frequency is given in FIG. 2.

It is observed that Tests 1 to 3 exhibit improved levels of performance in comparison with those of Example 11.
(1) Sold under the reference "Luviskol® K 90" by BASF
(2) Sold under the reference "Blanose® 7 MC" by Aqualon
(3) Sold under the reference "Simulsol® BPPE" by SEPPIC
(4) Sold under the reference "Antarox® CA 630 by Rhodia HPCII
(5) Sold under the reference "Solsperse® 20000" by Avecia
(6) Sold under the reference "GK UF2 96/97" by Kropfmulh
(7) Sold under the reference "Grafpower® TG 407" by Ucar
(8) Sold under the reference "GK UF4 96/97" by Kropfmulh
(9) Sold under the reference "SPF 16" by Ucar
(10) Sold under the reference "Grafpower® TG 40" by Ucar
(11) Sold under the reference "Solsperse® 27000" by Avecia
(12) Sold under the reference "Vulcan® XC 72R" by Cabot S.A.
(13) Sold under the reference "Latex® 651" by Ucar
(14) Sold under the reference "Carboset® 514 W" by Noveon
(15) Sold under the reference "Surfynol® 104-PA" by Air Products
(16) Sold under the reference "Simulsol® P10" by SEPPIC
(17) Sold under the reference "SPF 17" by Ucar
(18) Sold under the reference "Styronal® ND430" by BASF
(19) Sold under the reference "Tego Foamex® 830" by Degussa
(20) Sold under the reference "Styronal® D517" by BASF

The invention claimed is:

1. A glass strand or glass strand structure coated with an electrically conducting coating composition, the amount of said electrically conducting coating composition representing at least 20% and at most 200% (as % by weight of solid matter) of a glass strand or glass strand structural body, said electrically conducting coating composition comprising as % by weight of solid matter:
   6 to 50% of a film-forming agent, wherein the film-forming agent is a polyvinylpyrrolidone, a poly(vinyl alcohol), a styrene polymer, a poly(vinyl chloride), a polyurethane or mixture thereof,
   5 to 40% of at least one compound chosen from plasticizing agents, surface-active agents and/or dispersing agents,
   44 to 75% of electrically conducting particles,
   0 to 10% of a doping agent,
   0 to 10% of a thickening agent,
   0 to 15% of additives,
   wherein the electrically conducting particles consist of a mixture of (A) 2.5 to 45% by weight of solid matter of graphite particles having a size of from 10 to 100 μm, at least 5% by weight of the graphite particles are in the form of flakes or needles with an aspect ratio of greater than or equal to 5; (B) 0 to 45% by weight of solid matter of graphite particles having a size of less than 10 μm, and (C) 2.5 to 45% by weight of solid matter of carbon black particles having a size of less than 1 μm.

2. The strand or structure according to claim 1, wherein the plasticizing, surface-active and/or dispersing agent is chosen from optionally halogenated, aliphatic or aromatic, polyalkoxylated compounds, from polyalkoxylated fatty acid esters, from amino compounds, from silica derivatives and from the blends of these compounds.

3. The strand or structure according to claim 1, which is provided in the form of an assemblage of intertwined strands or nonintertwined strands.

4. The strand or structure according to claim 3, which exhibits an electromagnetic shielding value of between 5 and 50 dB measured between 100) MHz and 2.7 GHz.

5. A composite material, comprising a matrix reinforced by the strand or structure according to claim 1.

6. The composite material according to claim 5, wherein the matrix is a thermoplastic or thermosetting polymer or a cementing material.

7. The strand or structure according to claim 1, which comprises from 50 to 75% of the electrically conducting particles.

8. The strand or structure according to claim 1, which comprises from 6 to 45% of the film-forming agent.

9. The strand or structure according to claim 1, comprising, by weight of solid matter:
   15 to 40% of graphite particles having a size of 10 to 100 μm, at least 5% by weight of the graphite particles in the form of flakes or needles with an aspect ratio of greater than or equal to 5;
   5 to 25% of graphite particles with a size of less than 10 μm; and
   15 to 30% of carbon black particles having a size of less than 1 μm.

10. The strand or structure according to claim 1, wherein the amount of said electrically conductive coating composition represents at least 20% and at most 60% of the glass strand or glass strand structure body.

* * * * *